United States Patent
Yamamoto et al.

(10) Patent No.: US 12,304,110 B2
(45) Date of Patent: May 20, 2025

(54) PEELING METHOD AND PEELING APPARATUS

(71) Applicant: DISCO CORPORATION, Tokyo (JP)

(72) Inventors: Ryohei Yamamoto, Tokyo (JP); Koyo Honoki, Tokyo (JP); Koji Itabashi, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 274 days.

(21) Appl. No.: 17/664,478

(22) Filed: May 23, 2022

(65) Prior Publication Data

US 2022/0379520 A1    Dec. 1, 2022

(30) Foreign Application Priority Data

May 25, 2021    (JP) .................................. 2021-087328

(51) Int. Cl.
*B28D 5/00* (2006.01)
*B23K 26/53* (2014.01)
*B23K 103/00* (2006.01)

(52) U.S. Cl.
CPC ............ *B28D 5/0011* (2013.01); *B23K 26/53* (2015.10); *B28D 5/0052* (2013.01); *B23K 2103/50* (2018.08)

(58) Field of Classification Search
CPC .. B28D 5/0011; B28D 5/0052; B28D 5/0094; B28D 5/047; B28D 5/0082; B23K 26/53; B23K 2103/50; B23K 20/002; B23K 20/10; B23K 20/233; B23K 26/0006; B23K 2101/40; B23K 2103/52; B23K 26/57
See application file for complete search history.

(56) References Cited

U.S. PATENT DOCUMENTS 5,618,759 A * 4/1997 Boysel .............. H01L 21/67092
                                                    83/84
5,632,667 A * 5/1997 Earl ........................ B24B 37/30
                                                    451/388

(Continued)

FOREIGN PATENT DOCUMENTS

JP        60150929 A    8/1985
JP      2000094221 A    4/2000

(Continued)

OTHER PUBLICATIONS

Office Action issued in counterpart Japanese patent application No. 2021-087328, dated Feb. 12, 2025.

*Primary Examiner* — George R Koch
*Assistant Examiner* — Christopher C Caillouet
(74) *Attorney, Agent, or Firm* — Greer Burns & Crain Ltd.

(57) ABSTRACT

An ultrasonic wave is applied to an upper surface of an ingot via a liquid layer, in a state in which an outer circumferential region of a lower surface of the ingot is sucked. A lower side around an outer circumferential arc-shaped portion of the lower surface of the ingot is open so that liquid that serves as a medium of the ultrasonic wave does not collect around the outer circumferential arc-shaped portion of the lower surface of the ingot. As a result, a peel-off layer formed in the ingot is not immersed in liquid when an ultrasonic wave is applied to the upper surface of the ingot via the liquid layer. Consequently, even when the ingot becomes thin, the ingot can be separated at the peel-off layer, and a wafer can be peeled off from the ingot.

9 Claims, 11 Drawing Sheets

(56) References Cited

U.S. PATENT DOCUMENTS

| | | | | |
|---|---|---|---|---|
| 5,920,769 A * | 7/1999 | Ball | ................... | H01L 21/6836 |
| | | | | 438/106 |
| 2005/0205531 A1* | 9/2005 | Iizuka | ................ | B23K 26/0622 |
| | | | | 219/121.18 |
| 2015/0328872 A1* | 11/2015 | Koyanagi | ............... | H01L 21/78 |
| | | | | 156/73.1 |
| 2016/0240424 A1* | 8/2016 | Tsukamoto | ......... | H01L 21/6836 |
| 2019/0304800 A1 | 10/2019 | Yamamoto | | |
| 2020/0156190 A1* | 5/2020 | Yamamoto | ............. | B23K 26/53 |
| 2021/0050218 A1* | 2/2021 | Ozturk | ................ | B28D 5/0023 |

FOREIGN PATENT DOCUMENTS

| | | | |
|---|---|---|---|
| JP | 2019102513 A | 6/2019 | |
| JP | 2019175907 A | 10/2019 | |

\* cited by examiner

PEELING METHOD AND PEELING APPARATUS

BACKGROUND OF THE INVENTION

Field of the Invention

The present invention relates to a peeling method and a peeling apparatus by which a cylindrical ingot that has a peel-off layer formed therein is separated at the peel-off layer and a disk-shaped wafer is peeled off from the ingot.

Description of the Related Art

Semiconductor device chips are typically manufactured from disk-shaped wafers. These wafers are produced, for example, by first being cut out from a cylindrical semiconductor ingot (hereinafter also simply referred to as an ingot in some cases) by a wire saw and then being polished on a front surface thereof (see, for example, Japanese Patent Laid-open No. 2000-94221).

Specifically, when a wafer is cut out from an ingot by a wire saw, minute surface irregularities are formed on the front surface thereof, and the wafer is warped in whole (a warp is generated in the wafer). Hence, a wafer cut out in such a manner often has its front surface polished in order to have the surface irregularities removed and be planarized.

However, when a wafer is polished, part of the wafer becomes polishing swarf and is disposed, making the wafer thin. In light of this, a wafer is typically cut out from the ingot in such a manner that the wafer cut out from the ingot is thicker than those which are to be used for manufacturing semiconductor device chips.

Ingots used for manufacturing semiconductor device chips are expensive. Hence, producing wafers by a method requiring polishing tends to result in higher costs for manufacturing semiconductor device chips from such wafers.

Moreover, a single crystal silicon carbide (SiC) that is expected to be used as a material for power devices is high in hardness. Hence, cutting out a wafer from a single crystal SiC ingot by a wire saw tends to require longer time and wear the wire saw.

Consequently, manufacturing single crystal SiC wafers tends to require higher costs. In view of this, a method of peeling off a wafer from an ingot by a laser beam and an ultrasonic wave instead of a wire saw has been proposed (see, for example, Japanese Patent Laid-open No. 2019-102513).

In this method, first, a laser beam with a wavelength transmittable through an ingot is applied to the ingot, in a state in which the focused spot of the laser beam is positioned to a predetermined depth from an upper surface of the ingot. As a result, a peel-off layer with low strength (a layer including a modified portion in which SiC has been separated into silicon (Si) and carbon (C) and a crack that extends from the modified portion) is formed inside the ingot.

Next, an ultrasonic wave is applied to the upper surface of the ingot via a liquid layer. This leads to formation of a new crack in the peel-off layer, causing existing cracks to further extend and the peel-off layer to further decline in strength. Then, the upper surface side of the ingot is sucked to pull up the ingot. Consequently, the ingot is separated at the peel-off layer, and a wafer is peeled off from the ingot.

SUMMARY OF THE INVENTION

Peeling off a number of wafers from an ingot naturally makes the ingot thin. Using such a thinned ingot sometimes makes it difficult to peel off wafers as compared to using a sufficiently thick ingot.

In light of this, an object of the present invention is to provide a peeling method and a peeling apparatus by which an ingot that has a peel-off layer formed therein can be separated at the peel-off layer and a wafer can be peeled off from the ingot, even when the ingot has become thin.

In accordance with an aspect of the present invention, there is provided a peeling method for separating a cylindrical ingot that has a peel-off layer formed therein at the peel-off layer and peeling off a disk-shaped wafer from the ingot. The peeling method includes an ultrasonic wave applying step of applying an ultrasonic wave to an upper surface of the ingot via a liquid layer, in a state in which an outer circumferential region of a lower surface of the ingot is sucked and a lower side around an outer circumferential arc-shaped portion of the lower surface of the ingot is open.

In accordance with another aspect of the present invention, there is provided a peeling apparatus for separating a cylindrical ingot that has a peel-off layer formed therein at the peel-off layer and peeling off a disk-shaped wafer from the ingot. The peeling apparatus includes an ultrasonic wave applying unit that applies an ultrasonic wave to an upper surface of the ingot via a liquid layer and a chuck table that has a circular holding surface for holding under suction an outer circumferential region of a lower surface of the ingot. The holding surface includes a flat circular central region, an annular suction region that surrounds the central region and communicates with a suction source via a suction channel, and a flat annular outermost region that surrounds the suction region and is positioned on the outermost side of the holding surface. A width of a portion of the outermost region along a radial direction of the holding surface is equal to or less than 5% of a radius of the holding surface, the portion of the outermost region surrounding an outer circumferential arc-shaped portion of the suction region.

Further, in the peeling apparatus according to the present invention, an upper portion of the chuck table including the holding surface is preferably composed of stainless steel.

Moreover, in the peeling apparatus according to the present invention, the ultrasonic wave applying unit preferably includes a first ultrasonic wave applying unit that applies an ultrasonic wave to a first region in the upper surface of the ingot at a first energy density and a second ultrasonic wave applying unit that applies an ultrasonic wave to a second region wider than the first region in the upper surface of the ingot at a second energy density lower than the first energy density.

In the present invention, even when the ingot has become thin, the ingot can be separated at the peel-off layer, and a wafer can be peeled off from the ingot.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

The inventors of the present application (the "present inventors") made intensive studies regarding the difficulty in peeling off a wafer from a thin ingot and found out that such difficulty in peeling off a wafer from a thin ingot is attributable to immersion, in liquid, of the peel-off layer which is formed inside the ingot.

Specifically, an ultrasonic wave is applied to an upper surface of the ingot, in a state in which a lower surface of the ingot is held under suction on a chuck table that has a holding surface having a wider size than the lower surface of the ingot. When an ultrasonic wave is applied in such a state to the upper surface of the ingot via a liquid layer, the liquid flows along a side surface of the ingot and collects on the holding surface of the chuck table.

Here, as the ingot held on the chuck table becomes thinner, the distance between the peel-off layer formed inside the ingot and the holding surface of the chuck table becomes shorter. Hence, the thinner the ingot becomes, the more likely it is that the peel-off layer will be immersed in the liquid that has collected on the holding surface of the chuck table, at the time of application of an ultrasonic wave to the upper surface of the ingot.

As such, the present inventors experimentally used a chuck table that has a holding surface sized sufficiently smaller than the lower surface of the ingot, as the chuck table for holding under suction the lower surface of the ingot at the time of application of an ultrasonic wave to the upper surface of the ingot, to peel off a wafer from the ingot. However, even in this case, the present inventors sometimes faced difficulties in peeling off a wafer from the ingot.

The present inventors also made intensive studies in this regard and found out that the difficulty in peeling off a wafer from the ingot is due to an outer circumferential region of the lower surface of the ingot not being sucked. That is, the present inventors found out that, when the outer circumferential region of the lower surface of the ingot is not sucked, the ultrasonic wave is not efficiently propagated to a region of a peel-off layer that is positioned directly above the outer circumferential region, inhibiting cracks from extending in this region of the peel-off layer.

Figure 1A:
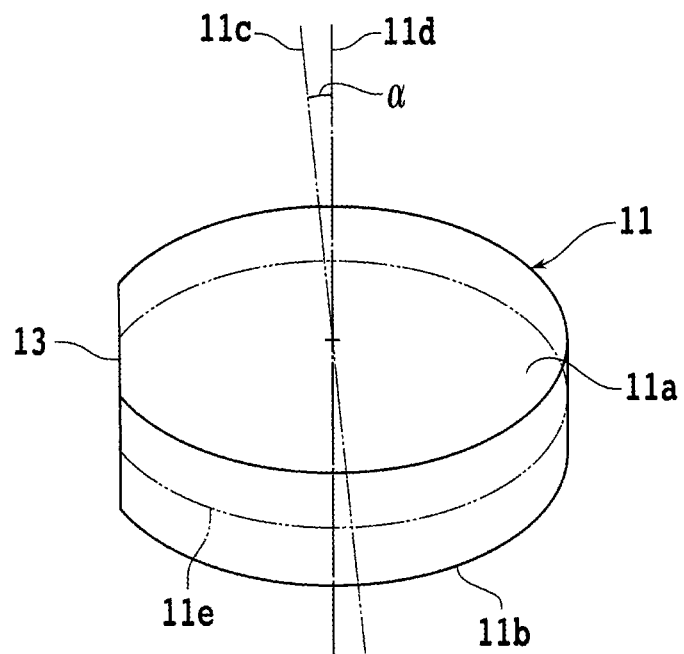
FIG. 1A is a perspective view schematically illustrating an example of an ingot.
Figure 1B:
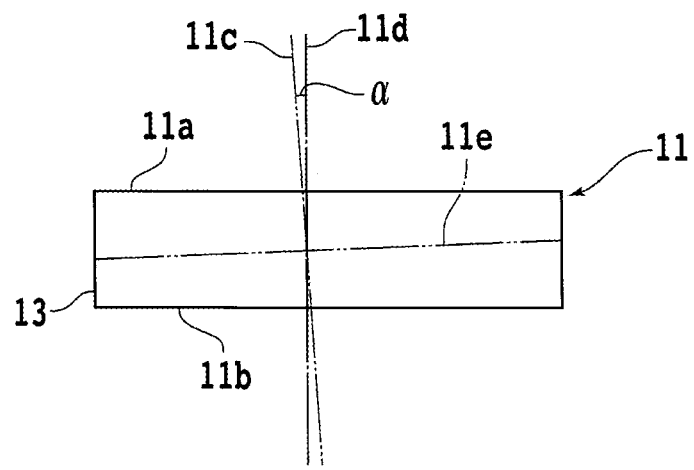
FIG. 1B is a side view schematically illustrating an example of the ingot.

The present inventors completed the present invention by using the knowledge described above. In the following description, an embodiment of the present invention will be described with reference to the attached drawings. FIG. 1A is a perspective view schematically illustrating an example of an ingot, and FIG. 1B is a side view schematically illustrating an example of the ingot. The ingot denoted by 11 and illustrated in FIGS. 1A and 1B is a cylindrical single crystal SiC ingot that has an upper surface 11a and a lower surface 11b that are substantially parallel to each other.

The ingot 11 is manufactured by epitaxial growth. In addition, the ingot 11 is produced such that a c-axis 11c of the single crystal SiC is slightly inclined with respect to a perpendicular line 11d of the upper surface 11a and the lower surface 11b, for the purpose of reducing lattice defects formed inside the ingot 11. For example, an angle (off angle) α formed between the c-axis 11c and the perpendicular line 11d falls within the range of 1° to 6° (the angle α is typically 4°).

On a side surface of the ingot 11, a flat portion indicating a crystal orientation of the single crystal SiC, that is, an orientation flat 13, is formed. The orientation flat 13 is formed to be parallel to a cross line where a plane parallel to a c-plane 11e of the single crystal SiC and the upper surface 11a or the lower surface 11b cross each other.

The ingot 11 may be formed of a semiconductor material other than SiC (for example, Si or gallium arsenide (GaN)). In addition, on the side surface of the ingot 11, the orientation flat 13 may not be formed. Alternatively, on the side surface of the ingot 11, a different orientation flat may be formed in addition to the orientation flat 13, or a cutout (notch) indicating the crystal orientation of the material constituting the ingot 11 may be formed in place of the orientation flat 13.

Figure 2:
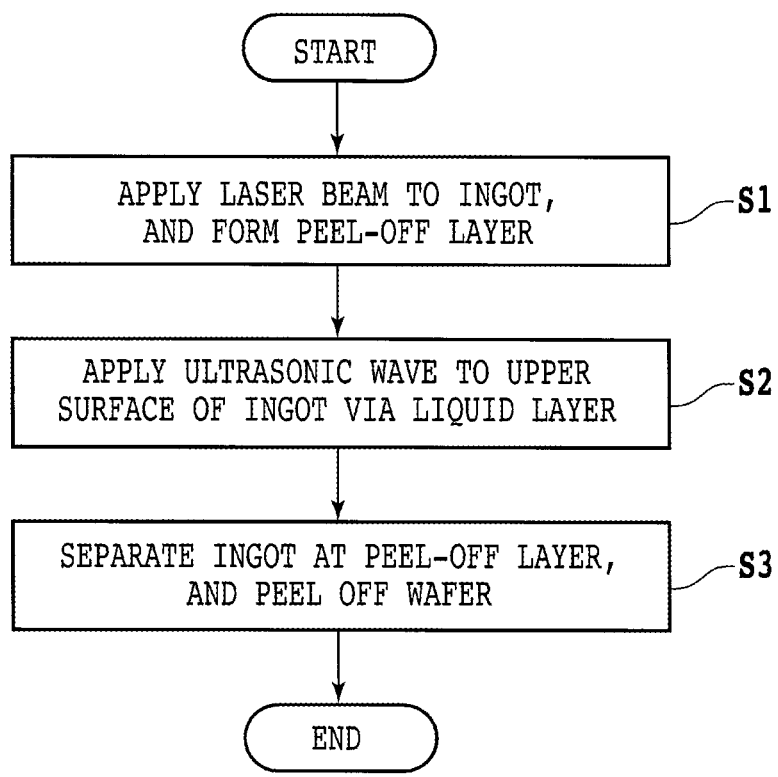
FIG. 2 is a flowchart illustrating an example of a peeling method for peeling off a wafer from the ingot.

FIG. 2 is a flowchart illustrating an example of a peeling method for peeling off a wafer from the ingot. In this method, first, a peel-off layer is formed inside the ingot 11 by application of a laser beam to the ingot 11 (peel-off layer forming step: S1).

Figure 3:
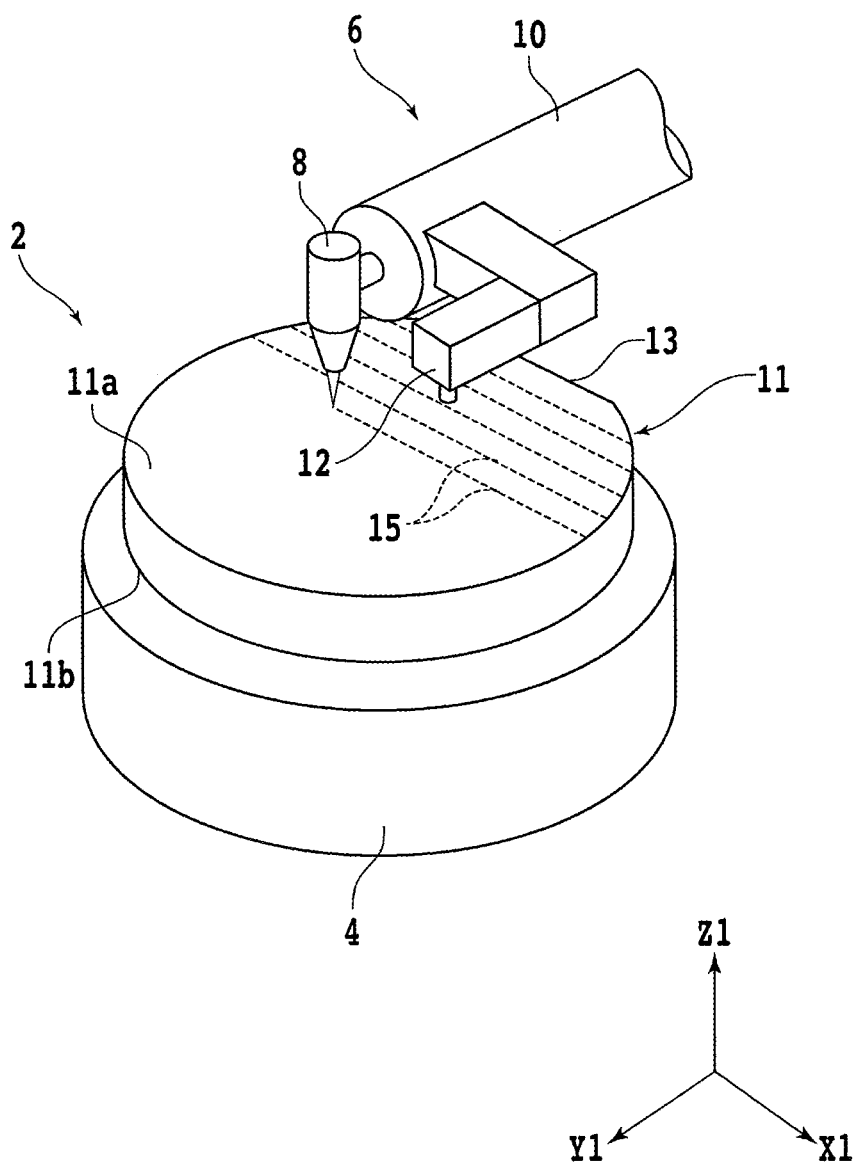
FIG. 3 is a perspective view schematically illustrating the manner of performing a peel-off layer forming step.

FIG. 3 is a perspective view schematically illustrating the manner of performing the peel-off layer forming step (S1). Specifically, FIG. 3 is a perspective view schematically illustrating the manner of applying a laser beam to the ingot 11 from the upper surface 11a side in a laser applying apparatus. In FIG. 3, an X1-axis direction and a Y1-axis direction are directions that are orthogonal to each other on a horizontal plane, and a Z1-axis direction is a direction (vertical direction) perpendicular to the X1-axis direction and the Y1-axis direction.

The laser applying apparatus denoted by 2 and illustrated in FIG. 3 includes a chuck table 4 that has a circular holding surface substantially parallel to the horizontal plane and that is capable of holding the ingot 11 with this holding surface. The chuck table 4 is connected to a suction source (not illustrated).

The suction source has an ejector or the like and is capable of generating a negative pressure in a space near the holding surface of the chuck table 4. When the suction source is operated in a state in which the ingot 11 is placed on the holding surface, the ingot 11 is held under suction on the chuck table 4.

Further, the chuck table 4 is coupled to an X1-axis direction moving mechanism (not illustrated) and a Y1-axis direction moving mechanism (not illustrated). The X1-axis direction moving mechanism and the Y1-axis direction moving mechanism each have, for example, a ball screw, a motor, and the like. When the X1-axis direction moving mechanism and/or the Y1-axis direction moving mechanism is operated, the chuck table 4 moves along the X1-axis direction and/or the Y1-axis direction.

The chuck table 4 is further coupled to a rotation mechanism (not illustrated). The rotation mechanism has, for example, a spindle, a motor, and the like. When the rotation mechanism is operated, the chuck table 4 rotates about a straight line that passes through the center of the holding surface along the Z1-axis direction, as the rotational axis.

Above the chuck table 4, a head 8 of a laser applying unit 6 is provided. The head 8 is provided on a distal end (one end) of a coupling section 10 that extends along the Y1-axis direction. The head 8 accommodates an optical system such as a condenser lens and a mirror, while the coupling section 10 accommodates an optical system such as a mirror and/or a lens.

The other end of the coupling section 10 is coupled to a Z1-axis direction moving mechanism (not illustrated). The Z1-axis direction moving mechanism has, for example, a ball screw, a motor, and the like. When the Z1-axis direction moving mechanism is operated, the head 8 and the coupling section 10 move along the Z1-axis direction.

The laser applying unit 6 has a laser oscillator (not illustrated) that generates laser beams with a wavelength transmittable through the ingot 11 (for example, 1,064 nm). The laser oscillator has, for example, neodymium-doped yttrium aluminum garnet (Nd:YAG) or the like as the laser medium. When laser beams are generated by the laser oscillator, the laser beams are applied to the holding surface side of the chuck table 4, via the optical systems accommodated in the coupling section 10 and the head 8.

On the lateral portion of the coupling section 10, an imaging unit 12 capable of imaging the holding surface side of the chuck table 4 is provided. The imaging unit 12 has, for example, a light source such as a light emitting diode (LED), an objective lens, and an imaging element such as a charge coupled device (CCD) image sensor or a complementary metal oxide semiconductor (CMOS) image sensor. The objective lens of the imaging unit 12 is provided at a position spaced from the head 8 along the X1-axis direction as viewed from the head 8.

The peel-off layer forming step (S1) is, for example, performed in the following order. First, the ingot 11 is placed on the holding surface of the chuck table 4 such that the upper surface 11a is oriented upward. Next, the suction source is operated such that the ingot 11 is held under suction on the chuck table 4.

Then, in reference to an image or the like of the upper surface 11a of the ingot 11 that is captured and formed by the imaging unit 12, the rotation mechanism rotates the chuck table 4 such that the orientation flat 13 becomes parallel to the X1-axis direction. Subsequently, the X1-axis direction moving mechanism and/or the Y1-axis direction moving mechanism moves the chuck table 4 such that the head 8 is positioned above a space on an outer side of the side surface of the ingot 11.

Thereafter, the optical system of the head 8 and/or the coupling section 10 is set such that the focused spot of the laser beam to be applied from the laser applying unit 6 is positioned at a height that is between the upper surface 11a and the lower surface 11b of the ingot 11. For example, the Z1-axis direction moving mechanism moves the head 8 and the coupling section 10 such that the condenser lens accommodated in the head 8 and the upper surface 11a of the ingot 11 have a predetermined distance therebetween in the Z1-axis direction.

Note that such setting for the optical system may be made at any timing prior to the application of a laser beam to the ingot 11. For example, setting for the optical system may be performed prior to the rotation and movement of the chuck table 4 described above. In addition, such setting for the optical system is performed such that the distance between the focused spot of the laser beam and the upper surface 11a of the ingot 11 becomes slightly greater than the thickness of the wafer that is to be used for manufacturing semiconductor device chips.

Next, the laser applying unit 6 applies, to the ingot 11, a laser beam with a wavelength transmittable through the ingot 11, while the X1-axis direction moving mechanism moves the chuck table 4 such that the focused spot of the laser beam is positioned inside the ingot 11. That is, the laser applying unit 6 applies a laser beam to the ingot 11, while the ingot 11 and the focused spot of the laser beam are relatively moved, along a cross line where the upper surface 11a and a plane parallel to the c-plane 11e of the ingot 11 (single crystal SiC) cross each other.

Then, application of the laser beam is repeated in a similar manner. Specifically, a laser beam is similarly applied to a rectilinear region along the X1-axis direction that is spaced a predetermined distance in the Y1-axis direction from a rectilinear region along the X1-axis direction of the ingot 11 to which the laser beam has been applied. This leads to formation of a modified portion 15 (for example, a portion obtained from SiC being separated into Si and C) in multiple columns inside the ingot 11, in a transverse plane parallel to the upper surface 11a and the lower surface 11b of the ingot 11.

Figure 4:
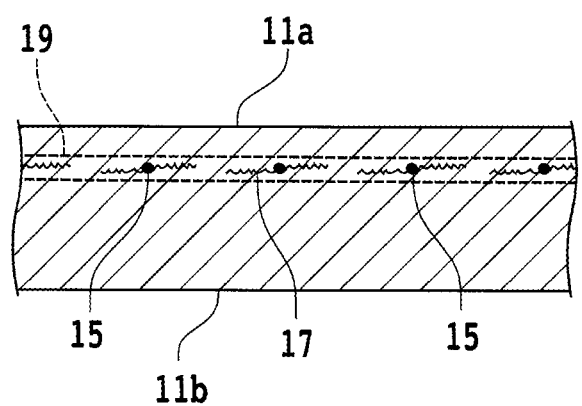
FIG. 4 is a cross sectional view schematically illustrating an example of an ingot that has undergone the peel-off layer forming step.

FIG. 4 is a cross sectional view schematically illustrating the ingot 11 that has undergone the peel-off layer forming step (S1). As illustrated in FIG. 4, when the modified portions 15 are formed inside the ingot 11 in the peel-off layer forming step (S1), a crack 17 can extend from the modified portion 15 along the c-plane 11e. As a result, a peel-off layer 19 including the modified portion 15 and the crack 17 is formed inside the ingot 11.

In the method illustrated in FIG. 2, an ultrasonic wave is applied to the upper surface 11a of the ingot 11 via a liquid layer (ultrasonic wave applying step: S2) after the peel-off layer forming step (S1) is performed. Then, the ingot 11 is separated at the peel-off layer 19 and a wafer is peeled off from the ingot 11 (peeling step: S3), after the ultrasonic wave applying step (S2) is performed.

Figure 5:
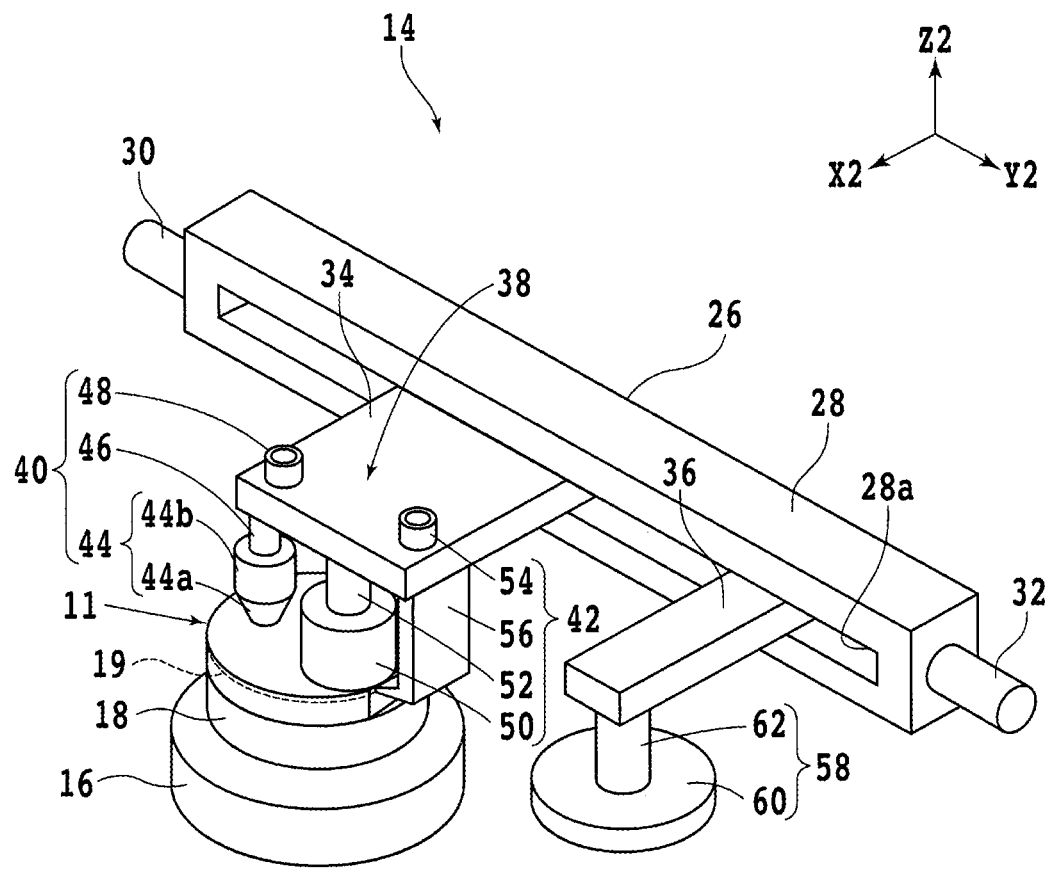
FIG. 5 is a perspective view schematically illustrating an example of a peeling apparatus.

FIG. 5 is a perspective view schematically illustrating an example of a peeling apparatus that is used in the ultrasonic wave applying step (S2) and the peeling step (S3). In FIG. 5, an X2-axis direction and a Y2-axis direction are directions that are orthogonal to each other on the horizontal plane, and a Z2-axis direction is a direction (vertical direction) perpendicular to the X2-axis direction and the Y2-axis direction.

The peeling apparatus denoted by 14 and illustrated in FIG. 5 has a cylindrical table base 16. On a central region of an upper portion of the table base 16, a lower portion of a cylindrical chuck table 18 is mounted by a fixture such as a bolt. A lower surface of the chuck table 18 has a diameter smaller than that of an upper surface of the table base 16.

The table base 16 is coupled to a rotation mechanism (not illustrated). When the rotation mechanism is operated, the table base 16 and the chuck table 18 rotate about a straight line that passes through the center of an upper surface of the chuck table 18 along the Z2-axis direction, as the rotational axis.

Figure 6A:
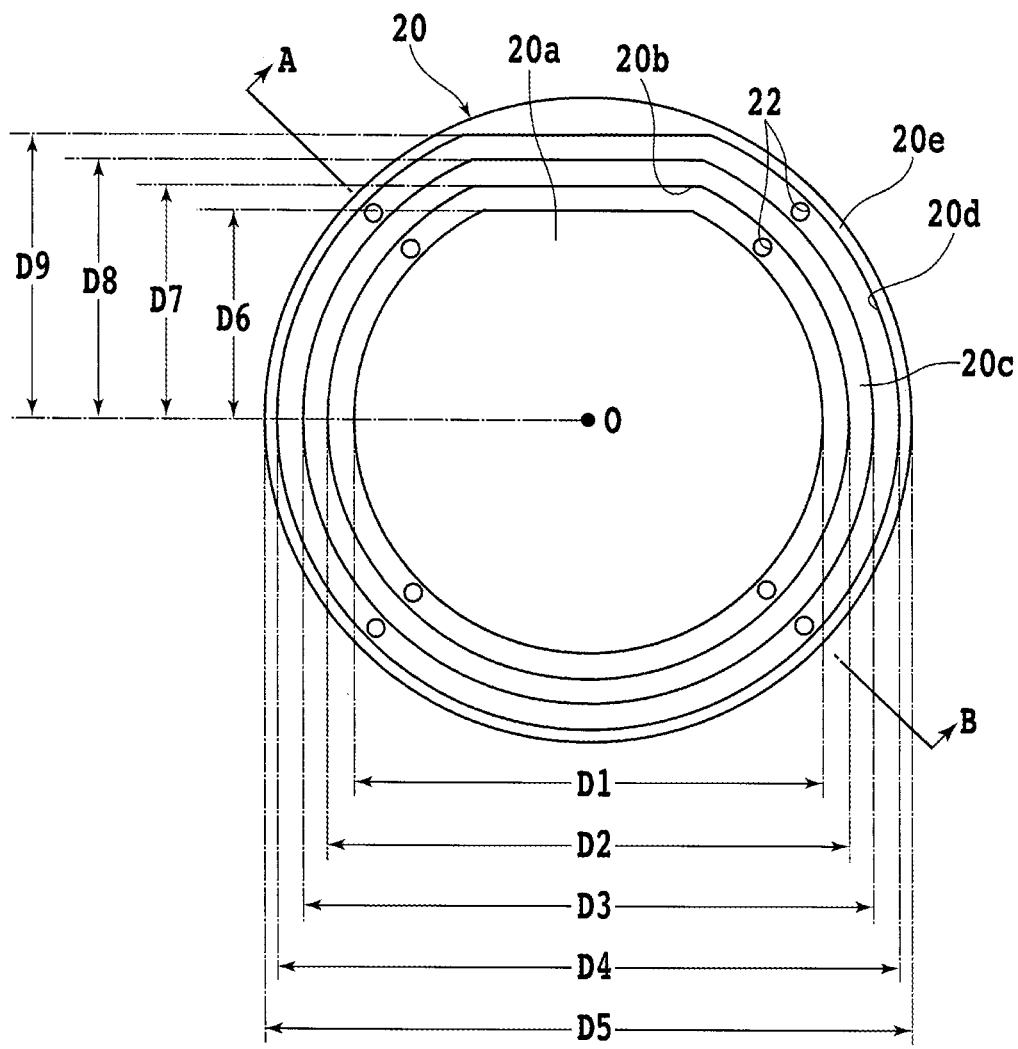
FIG. 6A is a top view schematically illustrating an example of a holding surface of a chuck table included in the peeling apparatus.
Figure 6B:
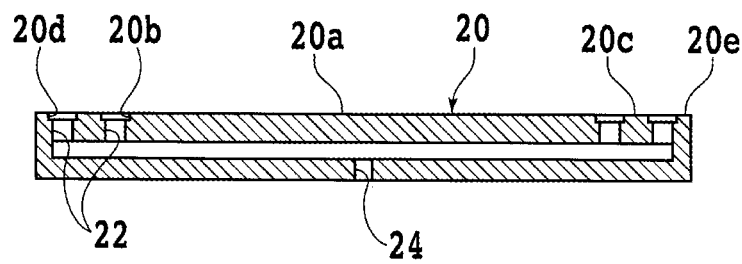
FIG. 6B is a cross sectional view schematically illustrating a cross section of the chuck table taken along line A-B depicted in FIG. 6A.

The upper surface of the chuck table 18 serves as a holding surface for holding the ingot 11. FIG. 6A is a top view schematically illustrating the holding surface of the chuck table 18, and FIG. 6B is a cross sectional view schematically illustrating a cross section of the chuck table 18 taken along line A-B illustrated in FIG. 6A.

The holding surface of the chuck table 18 denoted by 20 and illustrated in FIG. 6A includes a flat circular central region 20a, an annular first groove 20b that surrounds the central region 20a, a flat annular intermediate region 20c that surrounds the first groove 20b, an annular second groove 20d that surrounds the intermediate region 20c, and a flat annular outermost region 20e that surrounds the second groove 20d and is positioned on the outermost side of the holding surface 20.

Further, on a bottom surface of each of the first groove 20b and the second groove 20d, four openings 22 are provided at substantially equal intervals along a circumferential direction of the holding surface 20. The openings 22 communicate with a suction channel 24 provided inside the chuck table 18, and the suction channel 24 communicates with a suction source (not illustrated).

Hence, when the suction source is operated in a state in which the ingot 11 is placed on the holding surface 20 of the chuck table 18, a suction force acts on the lower surface 11b of the ingot 11 via the suction channel 24, the openings 22, the first groove 20b, and the second groove 20d.

This leads to the ingot 11 being held under suction on the chuck table 18. In other words, on the holding surface 20 of the chuck table 18, a region in which the first groove 20b and the second groove 20d are provided functions as a region (suction region) for sucking the ingot 11.

The radius of the holding surface 20 is designed to be substantially equal to the radius (distance between the center and a point on the outer circumferential arc-shaped portion) of the ingot 11 in plan view. Further, the outer circumferences of the central region 20a, the first groove 20b, the intermediate region 20c, and the second groove 20d are each designed to be similar to the outer circumference of the ingot 11 in plan view.

That is, these outer circumferences include portions that extend rectilinearly in correspondence with the orientation flat 13 formed on the side surface of the ingot 11. Further, the portions that are included in these outer circumferences and that extend rectilinearly are provided in the same direction as viewed from a center O of the holding surface 20.

Note that a width, along a radial direction of the holding surface 20, of the outermost region 20e, which does not function as a suction region, is preferably designed to be narrow as much as possible so that the chuck table 18 can hold under suction the outer circumferential region of the lower surface 11b of the ingot 11. For example, the width, along the radial direction of the holding surface 20, of the outermost region 20e, which surrounds the outer circumferential arc-shaped portion of the second groove 20d, is designed to be equal to or less than 5% of the radius of the holding surface 20. Further, this width is preferably equal to or less than 4% of the radius of the holding surface 20, more preferably equal to or less than 3%, and most preferably equal to or less than 2%.

Further, in order to have the suction force produced from the suction source act on the outer circumferential region of the lower surface 11b of the ingot 11 in a concentrated manner, a width, along the radial direction of the holding surface 20, of the central region 20a, which does not function as the suction region, is preferably designed to be wide as much as possible. For example, the distance between the outer circumferential arc-shaped portion of the central region 20a (an inner circumferential arc-shaped portion of the first groove 20b) and the center O of the holding surface 20 is designed to be 70% or more of the radius of the holding surface 20. Moreover, this distance is preferably 75% or more of the radius of the holding surface 20, more preferably 80% or more, and most preferably 85% or more.

Specifically, if the ingot 11 is an ingot of 4 inches, i.e., an ingot having a diameter of 100 mm, the holding surface 20 is only required to be designed such that distances D1 to D9 illustrated in FIG. 6A have the values described in the following table, for example.

TABLE 1

| Distance | D1 | D2 | D3 | D4 | D5 | D6 | D7 | D8 | D9 |
|---|---|---|---|---|---|---|---|---|---|
| mm | 72 | 80 | 88 | 96 | 100 | 33 | 37 | 41 | 45 |

Similarly, if the ingot 11 is an ingot of 6 inches, i.e., an ingot having a diameter of 150 mm, the holding surface 20 is only required to be designed such that the distances D1 to D9 illustrated in FIG. 6A have the values described in the following table, for example.

TABLE 2

| Distance | D1 | D2 | D3 | D4 | D5 | D6 | D7 | D8 | D9 |
|---|---|---|---|---|---|---|---|---|---|
| mm | 122 | 130 | 138 | 146 | 150 | 55 | 59 | 63 | 67 |

Further, the upper portion of the chuck table 18 including the holding surface 20 is preferably made of a material that does not inhibit propagation of ultrasonic waves from the ultrasonic wave applying unit described later to the region of the peel-off layer 19 positioned directly above the outer circumferential region of the lower surface 11b of the ingot 11. For example, this upper portion is preferably made of stainless steel or the like. This leads to ultrasonic waves being reflected by the holding surface 20 and efficiently propagated to the relevant region of the peel-off layer 19.

Figure 7A:
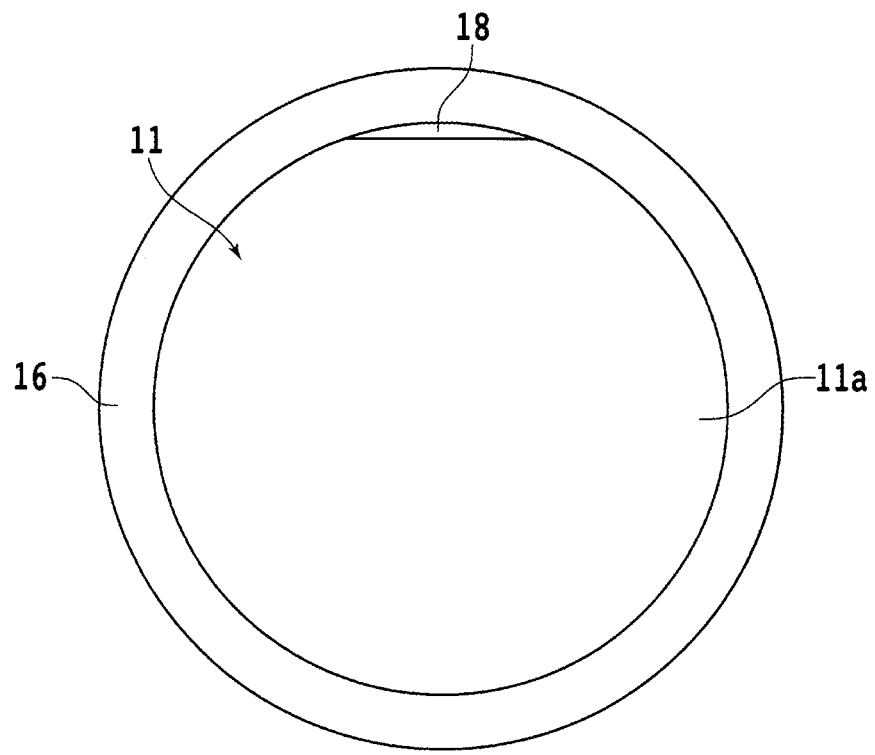
FIG. 7A is a top view schematically illustrating the chuck table holding the ingot.
Figure 7B:
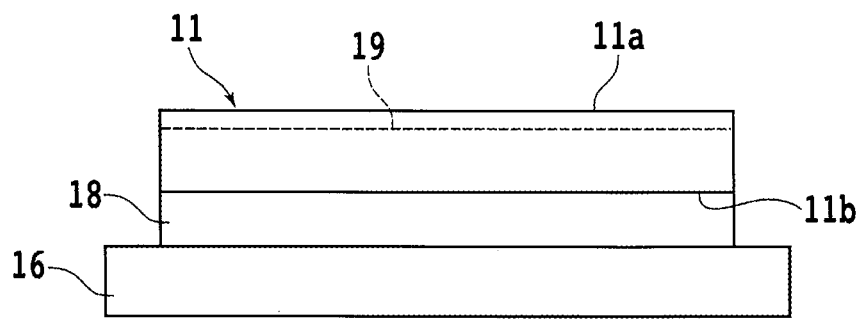
FIG. 7B is a side view schematically illustrating the chuck table holding the ingot.

FIG. 7A is a top view schematically illustrating the chuck table 18 holding the ingot 11, and FIG. 7B is a side view schematically illustrating the chuck table 18 holding the ingot 11. As illustrated in FIGS. 7A and 7B, the ingot 11 is held by the chuck table 18 in a state in which a lower side around the outer circumferential arc-shaped portion of the lower surface 11b is open.

Note that, in the present description, the state in which the lower side around the outer circumferential arc-shaped portion of the lower surface of the ingot is open refers to a state in which liquid that flows down from an upper side around the arc-shaped portion does not remain around that portion and instead flows further down to the lower side.

Remaining components of the peeling apparatus 14 will be described by referring to FIG. 5 again. On the obliquely upward position of the chuck table 18, a moving mechanism 26 is provided. The moving mechanism 26 extends along the Y2-axis direction and has a quadrangular prism-shaped frame body 28 which has an opening 28a provided on a side surface on the chuck table 18 side. The frame body 28 accommodates a first ball screw (not illustrated) and a second ball screw (not illustrated).

A proximal end portion of a screw shank of the first ball screw is coupled to a motor 30 through an opening provided on one end (rear end) of the frame body 28. Similarly, a proximal end portion of a screw shank of the second ball screw is coupled to a motor 32 through an opening provided on the other end (front end) of the frame body 28. Further, into the opening 28a of the frame body 28, a proximal end portion of a first moving plate 34 and a proximal end portion of a second moving plate 36 are inserted.

The proximal end portion of the first moving plate 34 is fixed to a nut of the first ball screw. Similarly, the proximal end portion of the second moving plate 36 is fixed to a nut of the second ball screw. Hence, when the motor 30 and/or the motor 32 is operated, the first moving plate 34 and/or the second moving plate 36 moves along the Y2-axis direction within a range in which the two plates do not contact each other.

On a distal end portion of the first moving plate 34, an ultrasonic wave applying unit 38 that applies an ultrasonic wave to the upper surface 11a of the ingot 11 is provided. The ultrasonic wave applying unit 38 has a first ultrasonic wave applying unit 40 and a second ultrasonic wave applying unit 42 that are provided to be arrayed along the Y2-axis direction.

The first ultrasonic wave applying unit 40 has an ultrasonic nozzle 44. The ultrasonic nozzle 44 has a hollow frustoconical section 44a with a width that gets narrower toward the lower end and a cylindrical section 44b that is provided to extend upward from an upper end of the frustoconical section 44a.

The frustoconical section 44a is provided such that a lower end surface thereof faces the upper surface 11a of the ingot 11 held on the chuck table 18. The lower end surface has an opening. In addition, the cylindrical section 44b has an ultrasonic transducer incorporated therein.

On the central region of the upper surface of the cylindrical section 44b of the ultrasonic nozzle 44, a distal end (lower end) portion of a rod of an air cylinder 46 is fixed. Further, the cylinder side of the air cylinder 46 is fixed to the lower surface side of the distal end portion of the first moving plate 34.

On the one end (rear end) side of the upper surface of the distal end portion of the first moving plate 34, a cylindrical first connection port 48 is disposed. To the first connection port 48, liquid (for example, water) is supplied from a liquid supply source (not illustrated) via a pipe (not illustrated) and a valve (not illustrated), for example.

The liquid supplied to the first connection port 48 is then supplied to a region through a flow channel provided in the first moving plate 34 and the air cylinder 46. To the region, vibration produced by the ultrasonic transducer incorporated in the cylindrical section 44b of the ultrasonic nozzle 44 is transmitted.

The liquid to which vibration produced by the ultrasonic transducer has been transmitted passes through the flow channel provided in the ultrasonic nozzle 44 and is then supplied to the upper surface 11a of the ingot 11 held on the chuck table 18 from the opening provided on the lower end surface of the frustoconical section 44a.

The second ultrasonic wave applying unit 42 has a cylindrical vibration member 50 that has a width greater than that of the cylindrical section 44b of the ultrasonic nozzle 44. The vibration member 50 is provided such that the lower end surface thereof faces the upper surface 11a of the ingot 11 held on the chuck table 18.

Further, the vibration member 50 has incorporated therein an ultrasonic transducer similar to the one incorporated in the cylindrical section 44b of the ultrasonic nozzle 44. When the ultrasonic transducer incorporated in the vibration member 50 vibrates, the vibration member 50 in whole vibrates.

On the central region of the upper surface of the vibration member 50, a distal end (lower end) portion of a rod of an air cylinder 52 is fixed. The cylinder side of the air cylinder 52 is fixed to the lower surface side of the distal end portion of the first moving plate 34.

On the other end (front end) side of the upper surface of the distal end portion of the first moving plate 34, a cylindrical second connection port 54 is provided. To the second connection port 54, liquid (for example, water) is supplied from a liquid supply source (not illustrated) via a pipe (not illustrated) and a valve (not illustrated).

The liquid supplied to the second connection port 54 is supplied to a liquid nozzle 56 provided at a position adjacent to the vibration member 50 and the air cylinder 52 in the Y2-axis direction. This liquid passes through a flow channel provided in the liquid nozzle 56 and is then supplied to the lower end surface of the vibration member 50 from an opening provided on the lower end surface of the liquid nozzle 56.

Further, on a distal end portion of the second moving plate 36, a peeling unit 58 is provided. The peeling unit 58 separates the ingot 11 at the peel-off layer 19 and peels off a disk-shaped wafer from the ingot 11.

The peeling unit 58 has a suction plate 60 which has multiple suction ports provided on a lower surface thereof. The multiple suction ports communicate with a suction source (not illustrated) such as an ejector via a flow channel (not illustrated) provided inside the suction plate 60 and a pipe (not illustrated) and a valve (not illustrated) that are coupled to the flow channel.

On the central region of an upper surface of the suction plate 60, a distal end (lower end) portion of a rod of an air cylinder 62 is fixed. The cylinder side of the air cylinder 62 is fixed to the lower surface side of the distal end portion of the second moving plate 36.

The ultrasonic wave applying step (S2) is performed, for example, by first applying an ultrasonic wave to the upper surface 11a of the ingot 11 by the first ultrasonic wave applying unit 40 and then applying an ultrasonic wave to the upper surface 11a of the ingot 11 by the second ultrasonic wave applying unit 42.

Figure 8A:
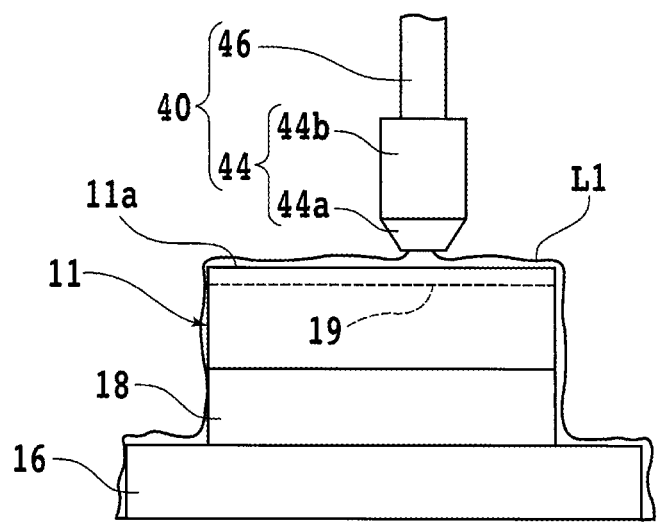
FIG. 8A is a side view schematically illustrating the manner of applying an ultrasonic wave to an upper surface of the ingot by a first ultrasonic wave applying unit.
Figure 8B:
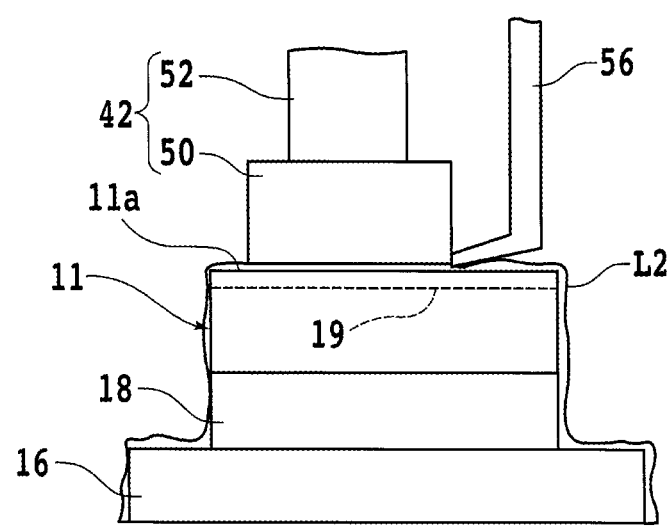
FIG. 8B is a side view schematically illustrating the manner of applying an ultrasonic wave to the upper surface of the ingot by a second ultrasonic wave applying unit.

FIG. 8A is a side view schematically illustrating the manner of applying an ultrasonic wave to the upper surface 11a of the ingot 11 by the first ultrasonic wave applying unit 40, and FIG. 8B is a side view schematically illustrating the manner of applying an ultrasonic wave to the upper surface 11a of the ingot 11 by the second ultrasonic wave applying unit 42.

In the ultrasonic wave applying step (S2), first, the ingot 11 is placed on the holding surface 20 of the chuck table 18 such that the upper surface 11a of the ingot 11 that has undergone the peel-off layer forming step (S1) is oriented upward. Next, the suction source is operated such that the outer circumferential region of the lower surface 11b of the ingot 11 is sucked and the ingot 11 is held on the chuck table 18.

Then, the motor 30 is operated, and the first moving plate 34 is positioned above the ingot 11. Subsequently, the air cylinder 46 is operated to lower the rod, and the lower end surface of the frustoconical section 44a of the ultrasonic nozzle 44 is brought close to the upper surface 11a of the ingot 11.

Then, liquid L1 is supplied from the liquid supply source to the ultrasonic nozzle 44, in a state in which the ultrasonic transducer incorporated in the cylindrical section 44b of the ultrasonic nozzle 44 is vibrated. At this time, the liquid L1 is supplied to the upper surface 11a of the ingot 11 from an opening provided on the lower end surface of the frustoconical section 44a of the ultrasonic nozzle 44 (see FIG. 8A).

While the liquid L1 is being supplied to the upper surface 11a of the ingot 11, the rotation mechanism is operated to rotate the table base 16 and the chuck table 18. As a result, with the liquid L1 serving as a medium, ultrasonic waves are applied to a predetermined region (first region) in the upper surface 11a of the ingot 11.

Then, the air cylinder 46 is operated to lift the rod, and the lower end surface of the frustoconical section 44a of the ultrasonic nozzle 44 is spaced from the upper surface 11a of the ingot 11. Subsequently, the air cylinder 52 is operated to lower the rod, and the lower end surface of the vibration member 50 is brought close to the upper surface 11a of the ingot 11.

Then, liquid L2 is supplied from the liquid supply source to the liquid nozzle 56, in a state in which the vibration member 50 is in whole vibrated with the ultrasonic transducer incorporated in the vibration member 50 being vibrated. At this time, the liquid L2 is supplied to the lower end surface of the vibration member 50 from the liquid nozzle 56 (see FIG. 8B).

Subsequently, while the liquid L2 is being supplied to the lower end surface of the vibration member 50, the rotation mechanism is operated to rotate the table base 16 and the chuck table 18. As a result, with the liquid L2 serving as a medium, ultrasonic waves are applied to a predetermined region (second region) in the upper surface 11a of the ingot 11. With the abovementioned processes, the ultrasonic wave applying step (S2) is completed.

Note that the area of the opening provided on the lower end surface of the frustoconical section 44a of the ultrasonic nozzle 44 is narrower than the area of the lower end surface of the vibration member 50. Hence, the area of the second region is wider than the area of the first region.

In addition, in the ultrasonic wave applying step (S2), the ultrasonic transducer used in the first ultrasonic wave applying unit 40 (ultrasonic nozzle 44) and the ultrasonic transducer used in the second ultrasonic wave applying unit 42 (vibration member 50) are vibrated under the same conditions.

Yet, the first region to which ultrasonic waves are applied when the first ultrasonic wave applying unit 40 is used is narrower than the second region to which ultrasonic waves are applied when the second ultrasonic wave applying unit 42 is used.

Hence, the amount of liquid that contributes to the application of ultrasonic waves to the upper surface 11a of the ingot 11 tends to be great in the case where the second ultrasonic wave applying unit 42 is used as compared to the case where the first ultrasonic wave applying unit 40 is used.

Accordingly, the energy density of the ultrasonic waves applied to the upper surface 11a of the ingot 11 by the second ultrasonic wave applying unit 42 is lower than the energy density of ultrasonic waves applied to the upper surface 11a of the ingot 11 by the first ultrasonic wave applying unit 40.

Figure 9:
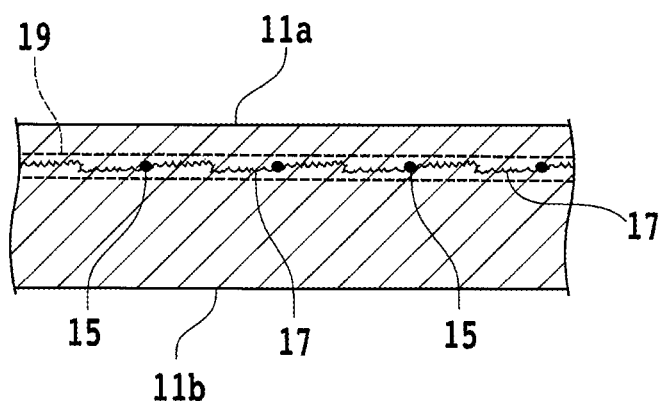
FIG. 9 is a cross sectional view schematically illustrating an example of an ingot that has undergone an ultrasonic wave applying step.

FIG. 9 is a cross sectional view schematically illustrating the ingot 11 that has undergone the ultrasonic wave applying step (S2). As illustrated in FIG. 9, when ultrasonic waves are applied to the upper surface 11a of the ingot 11 in the ultrasonic wave applying step (S2), a new crack 17 is generated in the peel-off layer 19, and existing cracks 17 further extend.

Figure 10A:
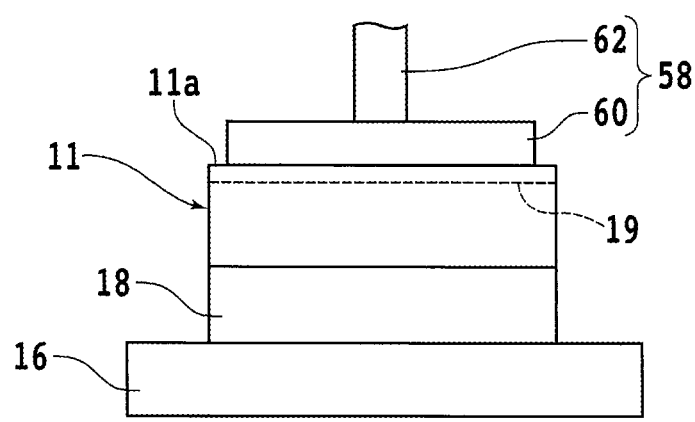
FIG. 10A is a side view schematically illustrating the manner of separating the ingot at the peel-off layer and peeling off the wafer from the ingot by a peeling unit.
Figure 10B:
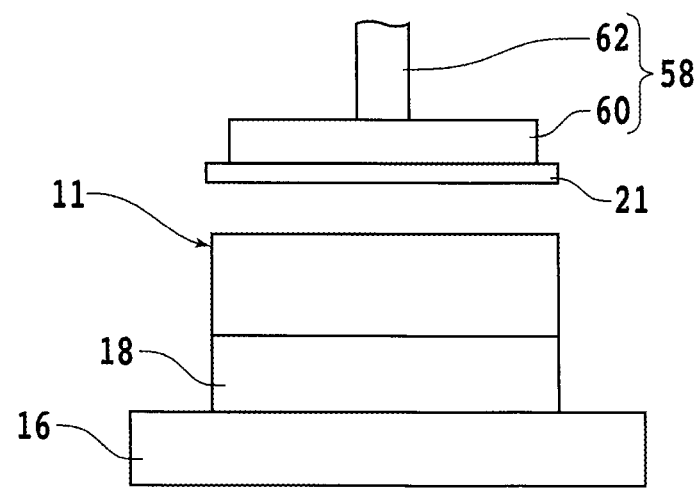
FIG. 10B is a side view schematically illustrating the manner of separating the ingot at the peel-off layer and peeling off the wafer from the ingot by the peeling unit.

Next, the peeling step (S3) is performed. FIGS. 10A and 10B are side views schematically illustrating the manner of separating the ingot 11 at the peel-off layer 19 and then peeling off a wafer from the ingot 11 by the peeling unit 58.

In the peeling step (S3), first, the motor 30 is operated, and the first moving plate 34 is retracted from the upper side of the ingot 11, while the motor 32 is operated, and the second moving plate 36 is positioned above the ingot 11.

Next, the air cylinder 62 is operated to lower the rod, and the lower surface of the suction plate 60 is brought close to or is made to contact the upper surface 11a of the ingot 11 (see FIG. 10A). Then, the suction source that communicates with the multiple suction ports provided on the lower surface of the suction plate 60 is operated.

Subsequently, the air cylinder 62 is operated to lift the rod, and the lower surface of the suction plate 60 is spaced from the upper surface 11a of the ingot 11. As a result, the ingot 11 which has the upper surface 11a sucked by the suction plate 60 is separated at the peel-off layer 19, and a wafer 21 is peeled off from the ingot 11 (see FIG. 10B).

In the method illustrated in FIG. 2, ultrasonic waves can be applied to the upper surface 11a of the ingot 11 via a liquid layer, in a state in which the outer circumferential region of the lower surface 11b of the ingot 11 is sucked and a lower side around the outer circumferential arc-shaped portion of the lower surface 11b of the ingot 11 is open.

As described above, in a case where the outer circumferential region of the lower surface 11b of the ingot 11 is sucked, ultrasonic waves are efficiently propagated to the region of the peel-off layer 19 that is positioned directly above the outer circumferential region of the lower surface 11b of the ingot 11, so that extension of cracks 17 in the region of the peel-off layer 19 is not inhibited.

In addition, in a case where the lower side around the outer circumferential arc-shaped portion of the lower surface 11b of the ingot 11 is open, liquid that serves as a medium for ultrasonic waves does not collect around the outer circumferential arc-shaped portion of the lower surface 11b of the ingot 11.

As a result, the peel-off layer 19 formed inside the ingot 11 will not be immersed in liquid, when ultrasonic waves are applied to the upper surface 11a of the ingot 11 via a liquid layer. Consequently, even when the ingot 11 becomes thin, the ingot 11 can be separated at the peel-off layer 19, and a wafer 21 can be peeled off from the ingot 11.

Note that the peeling method and the peeling apparatus described above are one mode of the present invention and the present invention is not limited to the peeling method and the peeling apparatus described above. For example, in the peeling method described above, the ultrasonic wave applying step (S2) is implemented by using the first ultrasonic wave applying unit 40 and the second ultrasonic wave applying unit 42 in this order. However, the ultrasonic wave applying step (S2) may be implemented by using either one of the two.

Moreover, in the peeling method described above, the ultrasonic wave applying step (S2) is implemented by vibrating the ultrasonic transducer (former) used in the first ultrasonic wave applying unit 40 (ultrasonic nozzle 44) and the ultrasonic transducer (latter) used in the second ultrasonic wave applying unit (vibration member 5) under the same conditions. However, the conditions used for vibrating the two ultrasonic transducers may be varied. For example, such conditions may be varied such that the energy density of the ultrasonic waves generated by the vibration of the latter becomes lower than the energy density of the ultrasonic waves generated by the vibration of the former.

Further, in the peeling method described above, the ultrasonic wave applying step (S2) and the peeling step (S3) are implemented by a single peeling apparatus 14, but in the peeling method according to the present invention, the two steps may be implemented by different apparatuses.

Further, in the peeling method described above, the wafer 21 is peeled off from the ingot 11 by having the upper surface 11a side of the ingot 11 that has the peel-off layer 19 formed therein sucked, but the method of peeling off the wafer 21 from the ingot 11 in the peeling method according to the present invention is not limited to the one described above. For example, the wafer 21 may be peeled off from the ingot 11 by manually pulling the upper surface 11a side of the ingot 11.

Further, in the peeling apparatus according to the present invention, the holding surface of the chuck table may have any shape, as long as ultrasonic waves can be applied to the upper surface 11a of the ingot 11 via a liquid layer, with the outer circumferential region of the lower surface 11b of the ingot 11 being sucked and no liquid collecting around the outer circumferential arc-shaped portion of the lower surface 11b of the ingot 11. For example, the radius of the holding surface may be designed to be slightly longer or shorter than the radius (distance between the center and a point on the outer circumferential arc-shaped portion) of the ingot 11 in plan view.

Figure 11:
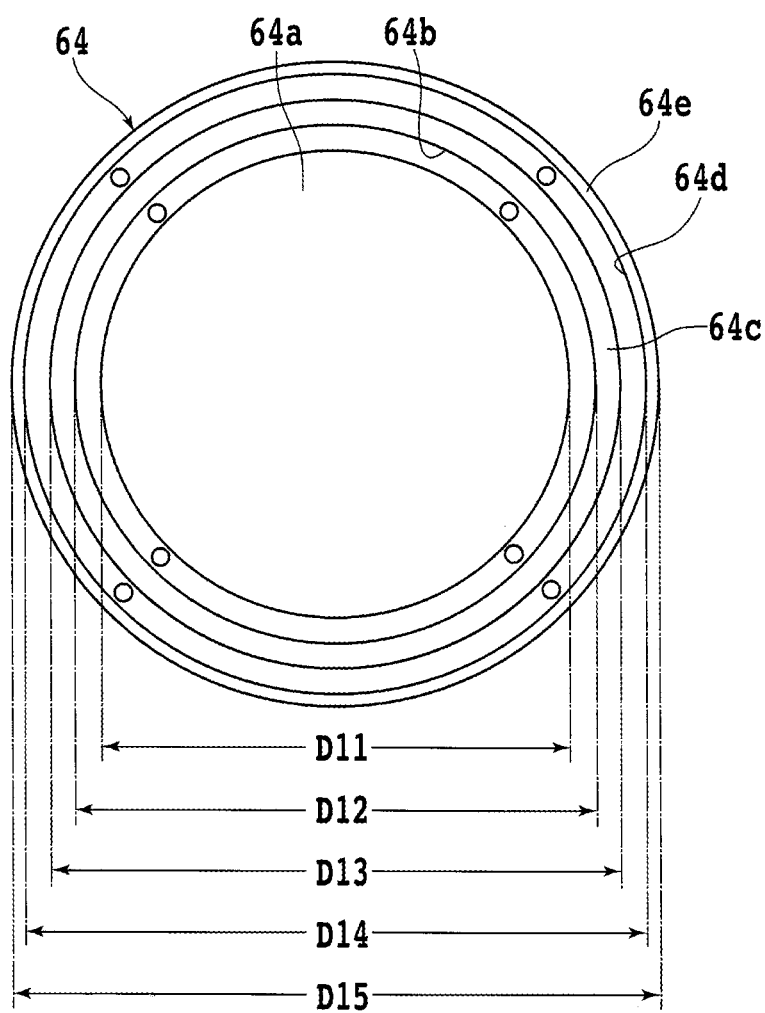
FIG. 11 is a top view schematically illustrating a modification of the holding surface of the chuck table included in the peeling apparatus.

Further, in a case of peeling off a wafer from an ingot which has no orientation flat provided on the side surface thereof, the groove included in the holding surface of the chuck table need not include a portion extending rectilinearly in correspondence with the orientation flat. FIG. 11 is a top view schematically illustrating such a holding surface of the chuck table.

A holding surface 64 of the chuck table illustrated in FIG. 11 has the same structure as that of the holding surface 20 of the chuck table 18 illustrated in FIGS. 6A and 6B. However, the holding surface 64 is different from the holding surface 20 in that each of the outer circumferences of a central region 64a, a first groove 64b, an intermediate region 64c, and a second groove 64d extends in a perfect circle shape.

The chuck table having the holding surface 64 is, for example, used in a peeling apparatus for peeling off a wafer from a relatively large ingot (for example, an ingot of 8 inches or more) that has a notch formed on its side surface.

Note that, as is the case with the holding surface 20, in the holding surface 64, it is preferred that a width of an outermost region 64e along a radial direction of the holding surface 64 be designed as narrow as possible and a width of the central region 64a along the radial direction be designed as wide as possible.

Specifically, if the ingot held on the holding surface 64 is an ingot of 8 inches, i.e., an ingot having a diameter of 200 mm, the holding surface 64 is only required to be designed such that distances D11 to D15 illustrated in FIG. 11 have the values described in the following table, for example.

TABLE 3

| Distance | D11 | D12 | D13 | D14 | D15 |
|---|---|---|---|---|---|
| mm | 172 | 180 | 188 | 196 | 200 |

Other structures, methods, and the like according to the abovementioned embodiment can be implemented by appropriately being modified within a scope not departing from the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A peeling method for separating a cylindrical ingot that has a peel-off layer formed therein at the peel-off layer and peeling off a disk-shaped wafer from the ingot, the peeling method comprising:
an ultrasonic wave applying step of applying an ultrasonic wave to an upper surface of the ingot via a liquid layer supplied to the upper surface of the ingot from an ultrasonic wave applying unit, in a state in which an outer circumferential region of a lower surface of the ingot is sucked on a holding surface of a chuck table and a lower side around an outer circumferential arc-shaped portion of the lower surface of the ingot has a radius approximately equal to an outer radius of the holding surface, wherein the liquid layer is supplied to the upper surface of the ingot from an opening of an ultrasonic nozzle of the ultrasonic wave applying unit.

2. The peeling method according to claim 1, wherein the ultrasonic wave applying step includes applying a second ultrasonic wave by a second ultrasonic wave applying unit to the upper surface of the ingot via a second liquid layer.

3. The peeling method according to claim 2, wherein the ultrasonic wave applying unit and the second ultrasonic wave applying unit are vibrated under the same conditions.

4. A peeling apparatus for separating a cylindrical ingot that has a peel-off layer formed therein at the peel-off layer and peeling off a disk-shaped wafer from the ingot, the peeling apparatus comprising:
an ultrasonic wave applying unit that applies an ultrasonic wave to an upper surface of the ingot via a liquid layer, wherein:
the ultrasonic wave applying unit includes a first ultrasonic wave applying unit that applies an ultrasonic wave to a first region in the upper surface of the ingot at a first energy density, and
the liquid layer is supplied to the upper surface of the ingot from an opening of an ultrasonic nozzle of the first ultrasonic wave applying unit; and
a chuck table that has a circular holding surface for holding under suction an outer circumferential region of a lower surface of the ingot, wherein:
the holding surface includes:
a flat circular central region,
an annular suction region that surrounds the central region and communicates with a suction source via a suction channel,
an outer annular groove within the annular suction region which communicates with the suction source via the suction channel, and a flat annular outermost region that surrounds the outer annular groove and is positioned on an outermost side of the holding surface, wherein the flat annular outermost region is defined between the outer annular groove and the outermost side of the holding surface, and a width of a portion of the outermost region along a radial direction of the holding surface is equal to or less than 5% of a radius of the holding surface, the portion of the outermost region surrounding an outer circumferential arc-shaped portion of the suction region.

5. The peeling apparatus according to claim 4, wherein an upper portion of the chuck table including the holding surface is composed of stainless steel.

6. The peeling apparatus according to claim 5, wherein:
the ultrasonic wave applying unit further includes:
a second ultrasonic wave applying unit that applies an ultrasonic wave to a second region wider than the first region in the upper surface of the ingot at a second energy density lower than the first energy density.

7. The peeling apparatus according to claim 4, wherein:
the ultrasonic wave applying unit further includes:
a second ultrasonic wave applying unit that applies an ultrasonic wave to a second region wider than the first region in the upper surface of the ingot at a second energy density lower than the first energy density.

8. The peeling apparatus according to claim 4, wherein the annular suction region includes an inner annular groove which is proximate to the flat circular central region and communicates with the suction source via the suction channel.

9. The peeling apparatus according to claim 8, wherein the annular suction region includes a flat annular intermediate region between the inner annular grove and the outer annular groove.

* * * * *